(12) United States Patent
Feng et al.

(10) Patent No.: US 12,204,748 B2
(45) Date of Patent: Jan. 21, 2025

(54) VIRTUAL KEYBOARD SETTING METHOD AND APPARATUS, AND STORAGE MEDIUM

(71) Applicant: BEIJING SOGOU TECHNOLOGY DEVELOPMENT CO., LTD., Beijing (CN)

(72) Inventors: Lei Feng, Beijing (CN); Jian Lu, Beijing (CN); Jin Cao, Beijing (CN); Miaoli Hu, Beijing (CN); Wei Hu, Beijing (CN); Yihang Yang, Beijing (CN); Xiaoxue Song, Beijing (CN); Haixin Li, Beijing (CN)

(73) Assignee: BEIJING SOGOU TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 18/450,479

(22) Filed: Aug. 16, 2023

(65) Prior Publication Data
US 2023/0393732 A1    Dec. 7, 2023

Related U.S. Application Data

(63) Continuation of application No. PCT/CN2022/114862, filed on Aug. 25, 2022.

(30) Foreign Application Priority Data

Sep. 30, 2021  (CN) .......................... 202111166897.1

(51) Int. Cl.
G06F 3/048     (2013.01)
G06F 3/04886   (2022.01)

(52) U.S. Cl.
CPC ................................ *G06F 3/04886* (2013.01)

(58) Field of Classification Search
CPC .................................................. G06F 3/04886
See application file for complete search history.

(56) References Cited

U.S. PATENT DOCUMENTS 10,331,339 B2 *   6/2019  Yang .................... G06F 3/04886
10,860,209 B1 *  12/2020  Sethi .................... G06F 3/0482
(Continued)

FOREIGN PATENT DOCUMENTS

CN      102203715 A    9/2011
CN      102362254 A    2/2012
(Continued)

OTHER PUBLICATIONS

The World Intellectual Property Organization (WIPO) International Search Report for PCT/CN2022/114862 Nov. 28, 2022 8 Pages (including translation).

(Continued)

*Primary Examiner* — Linh K Pham
(74) *Attorney, Agent, or Firm* — ANOVA LAW GROUP PLLC (57) ABSTRACT

A virtual keyboard setting method includes: determining an operation region and a trigger region, the operation region being a region operated in a screen for using an input method, and the trigger region being a region covered by an external entity when touching the screen; determining a display region of a virtual keyboard according to the operation region; determining an area of a virtual key in the virtual keyboard according to the trigger region; and setting the virtual keyboard according to the display region of the virtual keyboard and the area of the virtual key.

14 Claims, 4 Drawing Sheets

(56) References Cited

U.S. PATENT DOCUMENTS

| | | | |
|---|---|---|---|
| 2010/0241985 A1 | 9/2010 | Kim et al. | |
| 2013/0088439 A1* | 4/2013 | Shih | G06F 3/016 345/173 |
| 2013/0278565 A1 | 10/2013 | Park | |
| 2014/0082546 A1* | 3/2014 | Yang | G06F 3/04886 715/773 |
| 2015/0143276 A1* | 5/2015 | Luo | G06F 3/0418 715/773 |
| 2015/0153950 A1* | 6/2015 | Chang | G06F 3/0426 715/773 |
| 2015/0186037 A1* | 7/2015 | Kanatani | G06F 3/04883 715/773 |
| 2016/0259548 A1* | 9/2016 | Ma | G06F 1/1626 |
| 2016/0274788 A1* | 9/2016 | Li | G06F 3/0446 |
| 2017/0010806 A1* | 1/2017 | Pingco | G06F 3/0236 |
| 2017/0017393 A1* | 1/2017 | Luo | G06F 3/04812 |
| 2019/0018583 A1* | 1/2019 | Plank S | G06F 3/04886 |
| 2019/0265887 A1* | 8/2019 | Yang | G06F 3/0216 |
| 2020/0065469 A1* | 2/2020 | Norris, III | G06F 21/36 |
| 2021/0065455 A1* | 3/2021 | Beith | G06F 3/017 |
| 2022/0171529 A1* | 6/2022 | Hui | G06F 3/0484 |
| 2022/0382374 A1* | 12/2022 | Huang | G06F 3/03547 |
| 2023/0359279 A1* | 11/2023 | Liu | G06F 3/016 |
| 2023/0359351 A1* | 11/2023 | Liu | G06F 1/1662 |
| 2023/0393732 A1 | 12/2023 | Feng et al. | |

FOREIGN PATENT DOCUMENTS

| | | |
|---|---|---|
| CN | 103488400 A | 1/2014 |
| CN | 103577033 A | 2/2014 |
| CN | 104516664 A | 4/2015 |
| CN | 106155557 A | 11/2016 |
| CN | 108108082 A | 6/2018 |
| CN | 110874147 A | 3/2020 |
| CN | 111026322 A | 4/2020 |
| CN | 114063876 A | 2/2022 |
| EP | 3176687 A1 | 6/2017 |
| EP | 3557387 A1 | 10/2019 |
| JP | 2007274136 A | 10/2007 |
| JP | 2013223044 A | 10/2013 |
| TW | 201407460 A | 2/2014 |
| WO | 2020040355 A1 | 2/2020 |

OTHER PUBLICATIONS

The State Intellectual Property Office of the People's Republic of China (SIPO) Office Action 1 for 202111166897.1, Nov. 23, 2023 9 Pages (including translation).
The European Patent Office (EPO) The Extended European Search Report for Application No. 22874511.3 Sep. 13, 2024 15 Pages.

* cited by examiner

VIRTUAL KEYBOARD SETTING METHOD AND APPARATUS, AND STORAGE MEDIUM

CROSS-REFERENCES TO RELATED APPLICATIONS

This application is a continuation application of PCT Patent Application No. PCT/CN2022/114862, entitled "VIRTUAL KEYBOARD SETTING METHOD AND APPARATUS, STORAGE MEDIUM, AND COMPUTER PROGRAM PRODUCT" and filed on Aug. 25, 2022, which claims priority to Chinese Patent Application No. 202111166897.1 with an application date of Sep. 30, 2021, the entire contents of both of which are incorporated herein by reference.

FIELD OF THE TECHNOLOGY

The present disclosure relates to the technical field of intelligent control, and in particular to, a virtual keyboard setting method and apparatus, a storage medium, and a computer program product.

BACKGROUND OF THE DISCLOSURE

With the development of technology, smartphones, tablets, and other electronic devices have gradually become popular. When using an electronic device such as a smartphone, it is often necessary to input characters using an input method.

Generally, in an input process using an input method, in order to facilitate user input, an electronic device such as a smartphone often displays a virtual keyboard in a screen for user operation. Since each person's habit of holding the device and finger length and size are different, the input method application often allows a user to adjust the operation region of the virtual keyboard to be enlarged or reduced. However, the adjusting process is cumbersome.

SUMMARY

In view of the above problems, the embodiments of the present disclosure provide a virtual keyboard setting method and apparatus, and a storage medium, which can improve the setting efficiency of the virtual keyboard.

The embodiments of the present disclosure provide a virtual keyboard setting method, including: determining an operation region and a trigger region, the operation region being a region operated in a screen for using an input method, and the trigger region being a region covered by an external entity when touching the screen; determining a display region of a virtual keyboard according to the operation region; determining an area of a virtual key in the virtual keyboard according to the trigger region; and setting the virtual keyboard according to the display region of the virtual keyboard and the area of the virtual key.

The embodiments of the present disclosure provide a virtual keyboard setting apparatus, including: a first determination unit, configured to determine an operation region and determine a trigger region, the operation region being a region operated in a screen for using an input method, and the trigger region being a region covered by an external entity when the external entity touches the screen; a second determination unit, configured to determine a display region of a virtual keyboard according to the operation region; a third determination unit, configured to determine an area of a virtual key in the virtual keyboard according to the trigger region; and a setting unit, configured to set the virtual keyboard according to the display region of the virtual keyboard and the area of the virtual key.

The embodiments of the present disclosure provide a non-transitory storage medium including a stored program, the program, during operation, controlling a device on which the storage medium is located to execute the virtual keyboard setting method provided by the embodiments of the present disclosure.

The embodiments of the present disclosure provide an electronic device including at least one memory and one or more processors, one or more programs being stored in the at least one memory and configured to execute, by the one or more processors, the virtual keyboard setting method provided by the embodiments of the present disclosure.

The embodiments of the present disclosure achieve a virtual keyboard setting function by acquiring an operation region and a trigger region of a user, then determining a region of the virtual keyboard according to the operation region, then determining an area of each virtual key in the virtual keyboard according to the trigger region, and finally setting the virtual keyboard according to the region of the virtual keyboard and the area of each virtual key. In the above solution, the operation region is a region operated in a screen when a user needs to use an input method, and the trigger region is a region covered by an external entity when the external entity touches the screen. After acquiring the operation region and the trigger region of the user, the overall region of the whole virtual keyboard can be determined based on the operation region, and the area of each virtual key in the virtual keyboard can be determined based on the trigger region, thereby realizing a function of automatically setting the virtual keyboard based on the operation region and the trigger region of the user, and simplifying the setting process of the virtual keyboard. Since a key region corresponds to the region covered by the external entity when touching the screen, the accuracy of setting the key region can be improved.

BRIEF DESCRIPTION OF THE DRAWINGS

Various other advantages and benefits become clear to those ordinarily skilled in the art by reading the following detailed description of preferred implementations. The drawings are only for the purpose of illustrating the preferred implementations and are not to be construed as limiting the embodiments of the present disclosure. Throughout the drawings, the same reference numerals are used to represent the same components. In the drawings.

DESCRIPTION OF EMBODIMENTS

Exemplary embodiments of the present disclosure will be described below with reference to the drawings. Although exemplary embodiments of the present disclosure are shown in the drawings, it is to be understood that the present disclosure can be embodied in various forms and is not to be construed as limited to the embodiments set forth herein. Instead, these embodiments are provided to enable a more thorough understanding of the present disclosure and to be able to fully communicate the scope of the present disclosure to the skilled in the art.

Figure 1A:
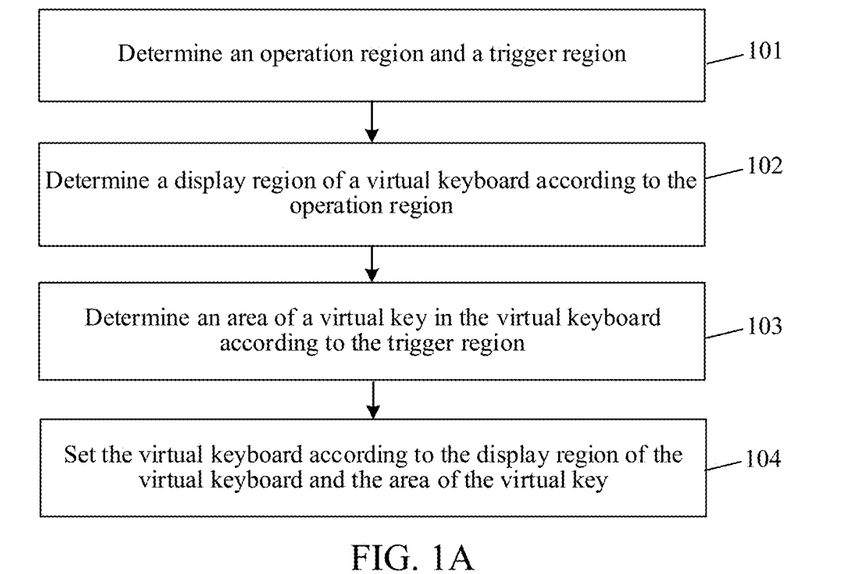
FIG. 1A shows a flowchart of a virtual keyboard setting method provided by an embodiment of the present disclosure.

The embodiments of the present disclosure provide a virtual keyboard setting method, as shown in FIG. 1A, including:

Step 101: Determine an operation region and a trigger region.

The operation region is a region operated in a screen when a user needs to use an input method, and the trigger region is a region covered by an external entity when the external entity touches the screen.

In the embodiments of the present disclosure, the operation region can be understood to be a region that the external entity can touch during operation in operating an electronic device with a touch display screen such as a smartphone, a tablet, a desktop, and the like. In practical application, an object for operating an electronic device may be a user or a mechanical hand. An external entity may be a finger of the user or a mechanical finger, and may also be an electronic handwriting pen. The electronic handwriting pen may be an electronic pen capable of completing human-computer interaction prepared based on the touch or capacitance principle. In the embodiments of the present disclosure, there is illustrated an object for operating an electronic device as a user, and an external entity as a finger. At this time, the operation region may be part of the screen that the thumb can touch when the user is holding the smartphone.

It should be noted that due to the different holding modes, finger lengths, and actual thicknesses of the electronic device, different users will have different operation regions in operating the same electronic device in practical application, and the same user will have different operation regions in operating different electronic devices. In this way, in the process of setting a virtual key by the method described in the embodiments of the present disclosure, an operation region of a user can be re-acquired when each time a virtual keyboard is set, to ensure the accuracy of subsequent virtual keyboard settings.

Meanwhile, in the embodiments of the present disclosure, the trigger region can be understood to be a region covered by a finger when the finger touches a screen when a user uses an electronic device. Since each person may operate the electronic device differently and the size of the finger belly based on each person's finger is also different, the size of the trigger region will vary from user to user. In a virtual keyboard, the area size of each virtual key will affect the accuracy during a user's trigger operation. In the embodiments of the present disclosure, the area of a region that a user can cover in a single touch of the screen can be determined by acquiring a user trigger region, which lays a foundation for subsequently setting the area of a virtual key.

Step 102: Determine a display region of the virtual keyboard according to the operation region.

After acquiring the user's operation region in the foregoing step 101, it can be determined which part of the region in the screen can be touched by the user's finger when operating the electronic device. Said part of the region can be used as the display region of the virtual keyboard during the subsequent operation of the user. Based on this, the display region of the virtual keyboard can be determined based on the operation region in the step.

It should be noted that in practical application, the region of the virtual keyboard described in the step can be understood as the whole region of the virtual keyboard. In this case, it can be understood that during the subsequent setting of the virtual keyboard, the whole virtual keyboard is located in the operation region, and the user can touch all the keys of the virtual keyboard during the subsequent operation. In this way, it is ensured that the virtual keyboard is suitable for user operation, avoiding the problem of inconvenience of operation caused by being located partly outside the region that the user can touch.

Of course, in another practical application, the virtual keyboard includes a plurality of different keys, and some of the keys are actually not common keys, while another portion is common keys. For example, the usage frequency of each virtual key in the virtual keyboard can be counted, where a virtual key with a usage frequency greater than a frequency threshold value is determined as a common key, and a virtual key with a usage frequency less than or equal to the frequency threshold value is determined as an uncommon key. In order to ensure the convenience during the user operation process, the display region of the virtual keyboard in the embodiments of the present disclosure may also partially exceed the operation region. The keys located in the operation region may be common keys, while the keys corresponding to the exceeding portion may be uncommon keys, which is equivalent to that in the subsequently set virtual keyboard, there may be a part of the region exceeding the operation region that the user can touch. The main common keys are in the operation region that the user can touch, thus ensuring the convenience of the user's common key operation. It may also avoid problems with individual keys which need to be displayed on the virtual keyboard but are not intended to be touched by mistake, for example, setting keys or closing keys of the virtual keyboard. The above two ways of determining the region of the virtual keyboard include but are not limited to the above solutions, and are not limited thereto. The user can make a selection based on actual needs.

Step 103: Determine an area of a virtual key in the virtual keyboard according to the trigger region.

The trigger region can reflect the region covered by the user's finger when touching the screen. In the embodiments of the present disclosure, during determining the area of the virtual key in the virtual keyboard based on the trigger region, the area of the two regions can be set to be the same. In this case, it is equivalent to setting a key with the same size according to the region covered by the finger when the user touches the screen, which ensures that the size of the key is the same as the region of the user's finger touching the screen, and avoids the problem that affects subsequent user operations due to the key being too large or too small.

Of course, in practical application, in order to ensure a virtual key operation effect, the area of each virtual key may also slightly exceed the area of the trigger region, that is, there may be a ratio between the area of the virtual key and the trigger region. For example, the ratio between the area of the virtual key and the area of the trigger region may be 1.25:1, or 1.1:1, or other ratios, which are not limited herein.

Step 104: Set the virtual keyboard according to the display region of the virtual keyboard and the area of the virtual key.

After determining the display region of the virtual keyboard and the area of the virtual key, the display region of the virtual keyboard can reflect the display position of the whole virtual keyboard in the screen, at the same time, the area of the virtual key can adjust the size of each key in the virtual keyboard. Therefore, the setting of the virtual keyboard can be realized based on the display region of the virtual keyboard and the area of each virtual key, thereby realizing a setting function of the virtual keyboard that can be automated based on the user's operation region and trigger region.

Based on this, the embodiments of the present disclosure provide a virtual keyboard setting method. With regard to the problem that the existing virtual keyboard setting process is relatively cumbersome, the present disclosure achieves a virtual keyboard setting function by acquiring an operation region and a trigger region of a user, then determining a region of the virtual keyboard according to the operation region, then determining an area of each virtual key in the virtual keyboard according to the trigger region, and finally setting the virtual keyboard according to the region of the virtual keyboard and the area of each virtual key. In the above solution, the operation region is a region operated in a screen when a user needs to use an input method, and the trigger region is a region covered by a user's finger when the finger touches the screen. After acquiring the operation region and the trigger region of the user, the overall region of the whole virtual keyboard can be determined based on the operation region, and the area of each virtual key in the virtual keyboard can be determined based on the trigger region, thereby realizing a function of automatically setting the virtual keyboard based on the operation region and the trigger region of the user. Compared with a related method, there is no need for the user to adjust the size of the operation region by manual operation, and there is no need to enter into the setting mode of the virtual keyboard of the input method to manually adjust the layout region, thereby simplifying the setting process of the virtual keyboard and solving the problem of the complicated setting process of the virtual keyboard of the related input method. In addition, in the above solution, the area of a single virtual key is determined by a trigger region, and the trigger region is a region covered by a user's finger when the finger touches the screen. The process of manually setting the key size required by a related setting process can be avoided, and the setting mode can be simplified. At the same time, since the key region corresponds to the region covered by the finger when touching the screen, the problem of inappropriate key size that may be caused by manually setting the key size is avoided, and the accuracy of setting the key region is improved.

In some embodiments, the execution of the determining an operation region includes: firstly, acquiring farthest end coordinates, a set of farthest end coordinates indicating a farthest position in the screen touched by the finger when using the electronic device; and then, determining the operation region according to the farthest end coordinates.

Figure 1B:
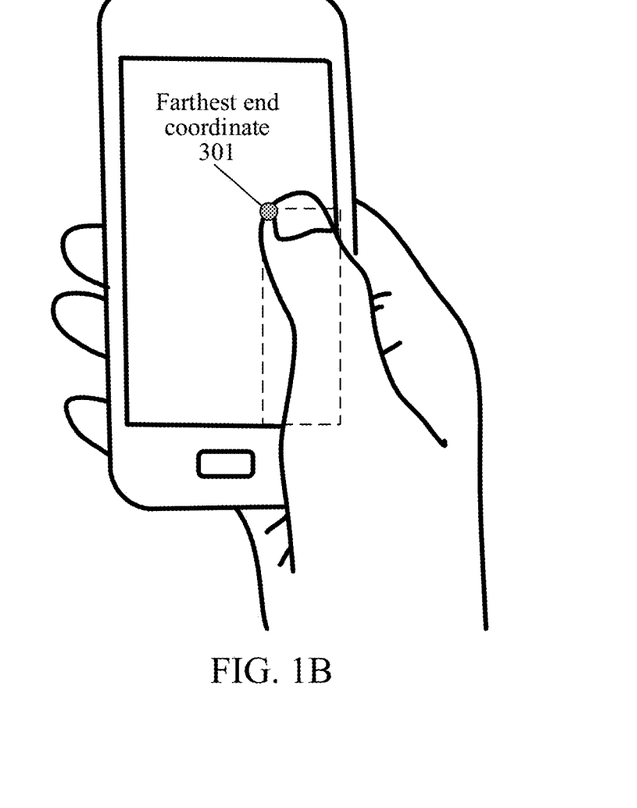
FIG. 1B shows a diagram of finger operation during the execution of a virtual keyboard setting method provided by an embodiment of the present disclosure.

Since the user cannot touch the whole region of the screen when holding the mobile phone in the actual operation, it is obviously not suitable to set the virtual keyboard in the region which is difficult for the user to touch in the process of setting the virtual keyboard. Therefore, in the embodiments of the present disclosure, the farthest position where a finger can touch when a user actually uses an electronic device can be determined by acquiring the farthest end coordinates triggered by the user, the farthest position being that the user can touch during holding the electronic device. As shown in FIG. 1B, after acquiring the farthest end coordinate 301 triggered by the user, the farthest position in the screen that the user's finger can touch is actually known. Therefore, the region formed between the farthest end coordinate and the edge of the screen, such as the dotted region in FIG. 1B, can be understood as a region that the user can touch during the actual operation, namely, an operation region. Of course, in practical application, in order to make the determined operation region more accurate, a computing device may also acquire a plurality of the farthest end coordinates, and take an average value based on these farthest end coordinates so as to determine the actual position of the farthest position that the user can touch, thereby obtaining a more accurate operation region.

In this way, in the above step, by acquiring the farthest end coordinates during operation of a user as the basis for determining an operation region, the method described in the embodiments of the present disclosure can ensure that the region of a subsequently set virtual keyboard is a region that the user can touch in the process of setting a virtual keyboard, thereby ensuring the accuracy of virtual keyboard setting. Of course, since the above process can be performed on the basis of the farthest end coordinates, that is, in the execution process of the method described in the embodiments of the present disclosure, actual operations can be acquired during the holding of a user. There is no need to allow the user to independently set in the virtual keyboard setting mode of the input method, improving the effect of the setting process, and simplifying the setting mode.

In some embodiments, the execution of the determining the operation region according to the farthest end coordinates in the foregoing embodiment may include: firstly, determining a first arc according to at least three sets of the farthest end coordinates, the first arc being used for characterizing farthest positions where a finger of the user can touch/reach; then, determining a first sector region according to the first arc and a target screen frame, the target screen frame being a screen frame located closest to a center of the first arc; and finally, determining the operation region based on the first sector region. For example, screen frames of a screen may include a top-side frame, a bottom-side frame, a left-side frame and a right-side frame. The target screen frame (e.g., screen frame located closest to a point) may include a horizontal frame (e.g., selected from the top-side frame and the bottom-side frame) and a vertical frame (e.g., selected from the left-side frame and the right-side frame).

Figure 1C:
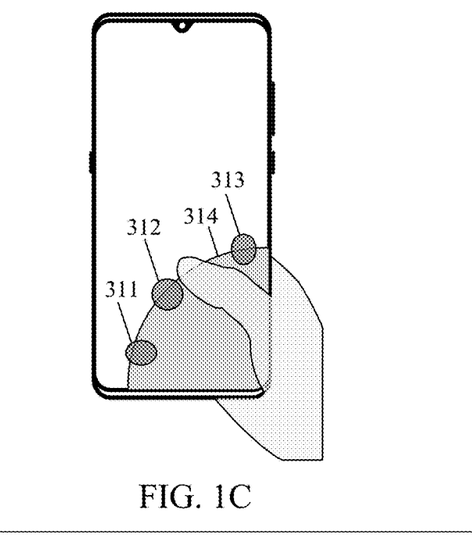
FIG. 1C shows a diagram of finger operation during the execution of a virtual keyboard setting method provided by an embodiment of the present disclosure.

In practical application, the region that the finger of the user can touch is actually a region covered by the arc-shaped motion of the thumb, centered on the thumb joint. That is to say, the region that the user can touch is actually a sector. Therefore, in order to further improve the accuracy of setting the virtual keyboard, in the embodiments of the present disclosure, the first arc of the farthest position that the user's finger can touch can be determined by at least three sets of farthest end coordinates. In practical application, after determining three sets of farthest end coordinate 311, 312, and 313, an arc 314 can be determined based on the three sets of farthest end coordinates, as shown in FIG. 1C. The region that the user can touch during actual operation, namely, the operation region, is then determined on the basis of the sector region formed by the arc (the first arc) and the edge of the screen intersecting with the first arc.

With the above solution, since the first arc can be determined on the basis of at least three sets of farthest end coordinates, and the farthest boundary to which the user's finger can touch in the screen can be determined, the sector formed by the first arc and the edge of the screen can be determined as an operation region. Since the sector corresponds to the feature of finger sliding in human biology, that is, the sector with the finger joint as the prototype during the holding process is a region that can be touched, the effect of using the first sector region as an operation region is achieved, and the accuracy of the region of the subsequently determined virtual keyboard is ensured.

In some embodiments, in some cases, the user's finger is inconvenient to touch for some screen regions closer to the joint. Therefore, during the determination of the operation region, these positions inconvenient to touch can be removed to avoid the influence of the part of region on the region setting of the subsequent virtual keyboard. Based on this, before the determining the operation region based on the first sector region, the method further includes:

firstly, acquiring at least three sets of nearest end coordinates triggered by a user, and determining a second arc according to the at least three sets of nearest end coordinates, a set of the nearest end coordinates being used for characterizing a nearest position in the screen where a finger of a user can touch (e.g., a position nearest to the target screen frame touched by the finger) when using an electronic device;

then, determining a second sector region according to the second arc and the target screen frame; and determining an intermediate region according to the first sector region and the second sector region, the intermediate region being a remaining region after removing the second sector region from the first sector region.

Based on this, the determining the operation region based on the first sector region in the foregoing embodiment includes:

determining the first sector region as the operation region, or determining the intermediate region as the operation region.

In the above solution, the nearest end coordinate can be understood to be a coordinate nearest to the palm of the hand among the coordinates that a user can touch during holding the electronic device for operation. Based on the characteristics of human fingers, especially the thumb, during the holding of the electronic device, the screen region closer to the palm of the hand is actually more difficult to touch by the fingers during the operation. Therefore, in the embodiments of the present disclosure, a computing device may acquire at least three sets of nearest end coordinates and determine a second arc, the region between the second arc and the edge of the screen intersecting with the second arc being actually a region which is more difficult to touch after the user's fingers shrink and bend, namely, the second sector region. That is, after the first sector region is determined in the foregoing embodiment, in order to facilitate the subsequent setting of the region of the virtual keyboard, it is also necessary to remove such a region as the second sector region which is less convenient for a user to touch during operation. The intermediate region obtained after deleting the second sector region from the first sector region is actually a region that a user's finger can touch during operation and is more convenient to touch. In this way, after determining the intermediate region as an operation region, it can be ensured that in subsequently determining the region of the virtual keyboard, the influence of such a region as the second sector region that is more difficult for a user's finger to touch, can be avoided, thereby facilitating the operation of the subsequently set virtual keyboard.

In some embodiments, the "determine a trigger region" described above may be achieved by determining the trigger region when using the electronic device, the trigger region being a region covered by the external entity during performing a trigger operation in the screen when using the electronic device.

In the embodiments of the present disclosure, a trigger region is a region covered by a user's finger when touching a screen, that is, a region touched by the user's finger each time operating a device such as a mobile phone. In order to facilitate the setting of the virtual keyboard, in the embodiments of the present disclosure, the method for acquiring the trigger region can be collected at any time when the user uses the electronic device. Thus, in the process of setting the virtual keyboard, the user is not required to separately input the trigger region to ensure the implementation of the acquisition function, thereby simplifying the setting process of the virtual keyboard. Of course, since the strength is different during a user operation process, the size of a trigger region after the same user touches the screen each time may also be different. In the embodiments of the present disclosure, the trigger region may also be an average value obtained by averaging the touch region during the user performs a trigger operation each time when using the electronic device for a plurality of times. Therefore, the trigger region when the user operates the electronic device can be assessed relatively accurately, avoiding the problem that the trigger region is inaccurate due to the greater strength of a particular number of user triggers.

In some embodiments, the determining the trigger region when using the electronic device includes: determining, during acquiring farthest end coordinates triggered by a user, a coverage region when each of the farthest end coordinates is triggered, and determining the coverage region as the trigger region.

In order to simplify the operation process, in the embodiments of the present disclosure, a coverage region can be acquired synchronously when a user triggers the farthest end coordinates, and the coverage region is determined as a trigger region. In this way, the function of synchronous acquisition of the farthest end coordinates and the trigger region is realized, avoiding the situation of two operations and simplifying the process of the whole solution.

In some embodiments, due to the different types of electronic devices, the category of electronic devices may also be considered in actually setting the virtual keyboard, for example, the virtual keyboard setting of a tablet may be different from that of a mobile phone. In view of this, in order to accommodate different electronic devices, before the acquiring an operation region and a trigger region of a user, the method further includes: determining a type of the virtual keyboard according to a parameter of the electronic device, the type of the virtual keyboard including an integrated keyboard and a split keyboard.

In some embodiments, the "determine an operation region and determine a trigger region" described above may be achieved by determining a trigger region and two of operation regions in response to the type of the virtual keyboard being determined as the split keyboard.

Accordingly, the "set the virtual keyboard according to the display region of the virtual keyboard and the area of each virtual key" described above can be achieved by setting the virtual keyboard according to the display region of the virtual keyboard corresponding to the two of the operation regions and the area of each virtual key.

Figure 1D:
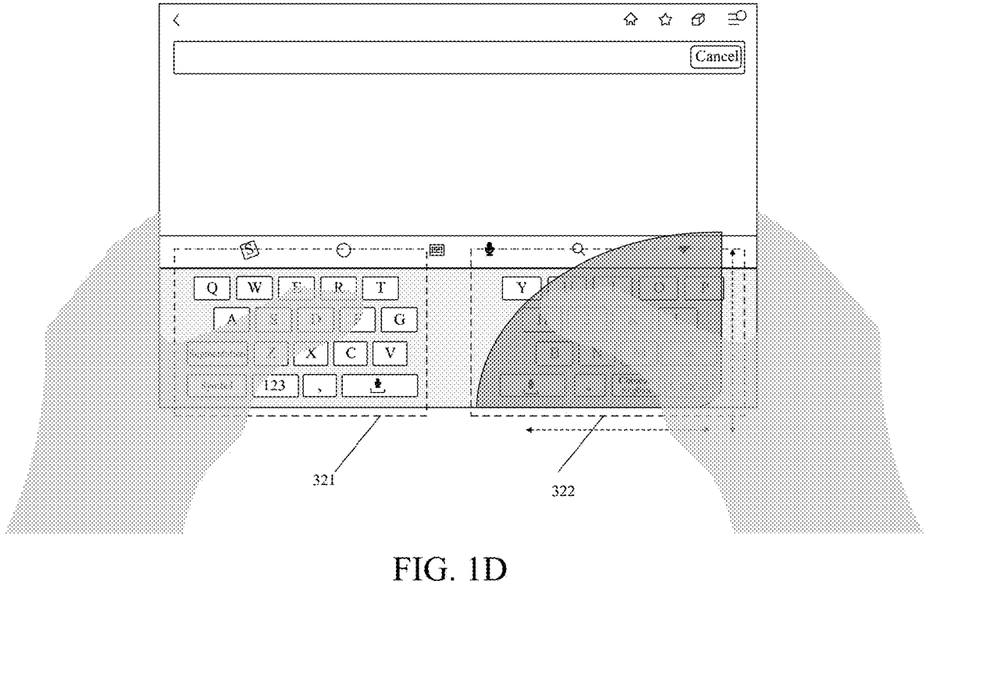
FIG. 1D shows a diagram of finger operation during the execution of a virtual keyboard setting method provided by an embodiment of the present disclosure.

Due to the different types of electronic devices, the virtual keyboard is divided into an integrated keyboard and a split keyboard. Among them, the integrated keyboard is mainly suitable for single-hand operation, with good applicability in mobile phones. However, a split keyboard, as the name implies, is two different independent keyboards. As shown in FIG. 1D, a left hand and a right hand respectively correspond to a part of the keyboard, where the left hand corresponds to a left half 321 of the keyboard and the right hand corresponds to a right half 322 of the keyboard, which is conducive to user operation. In the embodiments of the present disclosure, when it is determined that the type of the virtual keyboard is a split keyboard, this indicates that a user needs two hands to operate; and in the process of setting the virtual keyboard, it is actually necessary to set two regions. For this reason, in the process of determining the operation region, it is necessary to acquire two operation regions, the two operation regions corresponding to a left hand and a right hand, respectively.

Of course, in determining each of the operation regions, it is performed in a manner consistent with the steps and manners in the foregoing embodiments, which will not be repeated here. The embodiments of the present disclosure can determine the type of the virtual keyboard based on the parameters of the electronic device, and acquire two operation regions corresponding to two hands when the split keyboard needs to be set, ensuring the setting function of the virtual keyboard under two-hand operation, the implementation of the setting function of the split keyboard of the electronic device requiring a two-hand operation, and the user's operation.

Figure 2:
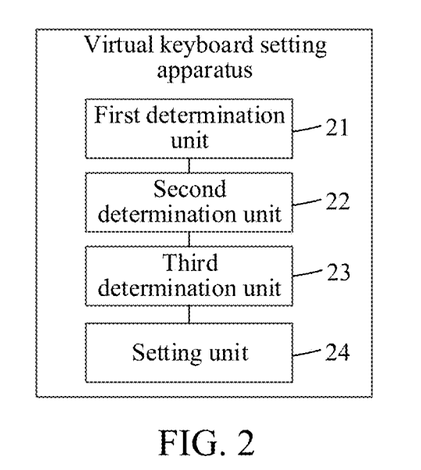
FIG. 2 shows a block diagram of a virtual keyboard setting apparatus provided by an embodiment of the present disclosure.

As an implementation of the method shown in the above FIG. 1A and various embodiments, the embodiments of the present disclosure further provide a virtual keyboard setting apparatus for implementing the method shown in the above FIG. 1A and various embodiments. The apparatus embodiment corresponds to the foregoing method embodiment. For the convenience of reading, the details of the foregoing method embodiment will not be repeated one by one in the apparatus embodiment. It is to be clear that the apparatus in the present disclosure can correspondingly realize all the contents of the foregoing method embodiment. As shown in FIG. 2, the apparatus includes a first determination unit 21, a second determination unit 22, a third determination unit 23, and a setting unit 24, where the first determination unit 21 may be configured to determine an operation region and determine a trigger region, the operation region being a region operated in a screen for using an input method, and the trigger region being a region covered by an external entity when the external entity touches the screen;

the second determination unit 22 may be configured to determine a display region of the virtual keyboard according to the operation region;

the third determination unit 23 may be configured to determine an area of each virtual key in the virtual keyboard according to the trigger region; and the setting unit 24 may be configured to set the virtual keyboard according to the display region of the virtual keyboard and the area of each virtual key.

By the above technical solution, the present disclosure provides a virtual keyboard setting method and apparatus. With regard to the problem that the existing virtual keyboard setting process is relatively cumbersome, the present disclosure achieves a virtual keyboard setting function by acquiring an operation region and a trigger region of a user, then determining a region of the virtual keyboard according to the operation region, then determining an area of each virtual key in the virtual keyboard according to the trigger region, and finally setting the virtual keyboard according to the region of the virtual keyboard and the area of each virtual key. In the above solution, the operation region is a region operated in a screen when a user needs to use an input method, and the trigger region is a region covered by an external entity when the external entity touches the screen. After acquiring the operation region and the trigger region of the user, the overall region of the whole virtual keyboard can be determined based on the operation region, and the area of each virtual key in the virtual keyboard can be determined based on the trigger region, thereby realizing a function of automatically setting the virtual keyboard based on the operation region and the trigger region of the user. Compared with a related method, there is no need for the user to adjust the size of the operation region by manual operation, and there is no need to enter into the setting mode of the virtual keyboard of the input method to manually adjust the layout region, thereby simplifying the setting process of the virtual keyboard and solving the problem of the complicated setting process of the virtual keyboard of the related input method. In addition, in the above solution, the region of the virtual key is determined by a trigger region, and the trigger region is a region covered by the external entity when the external entity touches the screen. The process of manually setting the key size required by a related setting process can be avoided, and the setting mode can be simplified. At the same time, since the key region corresponds to the region covered by the external entity when touching the screen, the problem of inappropriate key size that may be caused by manually setting the key size is avoided, and the accuracy of setting the key region is improved.

In some embodiments, the first determination unit includes: an acquisition module, configured to acquire farthest end coordinates, a set of the farthest end coordinates being used for characterizing a farthest position in the screen where the finger can touch when using the electronic device; and a first determination module, configured to determine the operation region according to the farthest end coordinates.

In some embodiments, the first determination module includes: a first determination sub-module, configured to determine a first arc according to at least three of the farthest end coordinates, the first arc being used for characterizing a farthest position where the external entity of the user can touch; a second determination sub-module, configured to determine a first sector region according to the first arc and a target screen frame, the target screen frame being a screen frame near a center of the first arc; and a third determination sub-module, configured to determine the operation region based on the first sector region.

In some embodiments, the first determination module further includes: an acquisition sub-module, configured to acquire at least three sets of nearest end coordinates and determine a second arc according to the at least three sets of nearest end coordinates, the nearest end coordinates being used for characterizing a nearest position in the screen where the external entity can touch when using the electronic device; a fourth determination sub-module, configured to determine a second sector region according to the second arc and the target screen frame; a fifth determination sub-module, configured to determine an intermediate region according to the first sector region and the second sector region, the intermediate region being a remaining region after removing the second sector region from the first sector region; and the third determination sub-module, configured to determine the first sector region as the operation region or determine the intermediate region as the operation region.

In some embodiments, the first determination unit further includes: a second determination module, configured to determine the trigger region when using the electronic device, the trigger region being a region covered by the external entity during performing a trigger operation in the screen when using the electronic device.

In some embodiments, the second determination module is configured to determine, during acquiring farthest end coordinates, a coverage region when each of the farthest end coordinates is triggered, and determine the coverage region as the trigger region.

In some embodiments, the apparatus further includes: a fourth determination unit, configured to determine a type of the virtual keyboard according to a parameter of the electronic device, the type of the virtual keyboard including an integrated keyboard and a split keyboard; the first determination unit, configured to determine a trigger region and two of operation regions in response to the type of the virtual keyboard being determined as the split keyboard; and the setting unit, configured to set the virtual keyboard according to the display region of the virtual keyboard corresponding to the two of the operation regions and the area of each virtual key.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

The method provided by the embodiments of the present disclosure can be executed by a client or a server, and the client and the server executing the above method are described below.

Figure 3:
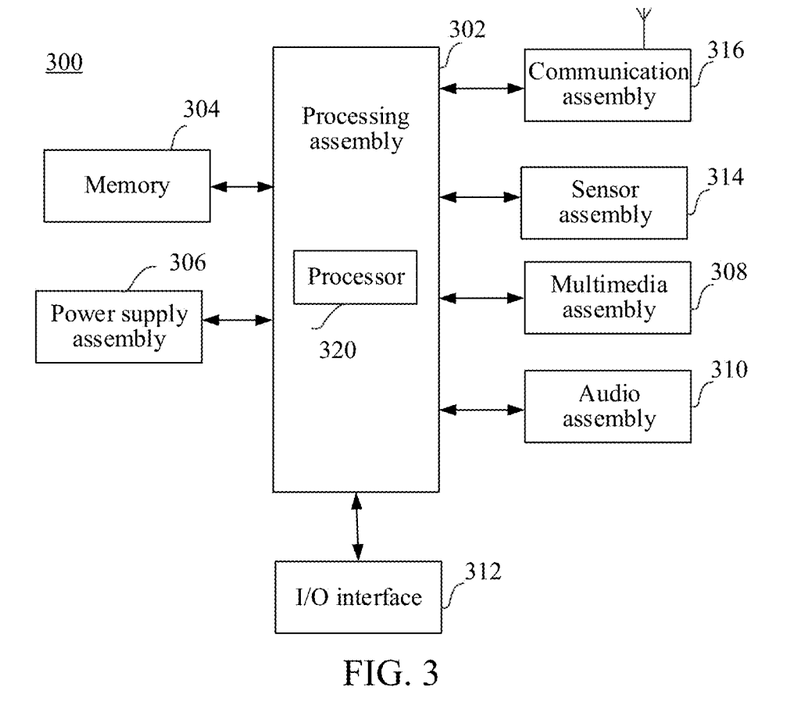
FIG. 3 is a structural diagram of a client provided by an embodiment of the present disclosure.

FIG. 3 shows a block diagram of a client 300. For example, the client 300 may be a mobile phone, a computer, a digital broadcast terminal, a message transceiver device, a game console, a tablet device, a medical device, a fitness device, a personal digital assistant, and the like.

Referring to FIG. 3, the client 300 may include one or more of the following assemblies: a processing assembly 302, a memory 304, a power supply assembly 306, a multimedia assembly 308, an audio assembly 310, an input/output (I/O) interface 312, a sensor assembly 314, and a communication assembly 316.

The processing assembly 302 generally controls overall operation of the client 300, such as operations associated with display, telephone calls, data communications, camera operations, and recording operations. The processing assembly 302 may include one or more processors 320 to execute instructions to perform all or part of the steps of the above methods. In addition, the processing assembly 302 may include one or more modules, to facilitate the interaction between the processing assembly 302 and other assemblies. For example, the processing assembly 302 may include a multimedia module to facilitate the interaction between the multimedia assembly 308 and the processing assembly 302.

The memory 304 is configured to store various types of data to support operations at the client 300. Examples of such data include instructions for any application or method operating on the client 300, contact data, phone book data, messages, pictures, videos, and the like. The memory 304 may be implemented by any type of volatile or non-volatile memory devices or combination thereof, such as static random-access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disks.

The power supply assembly 306 provides power to the various assemblies of the client 300. The power supply assembly 306 may include a power supply management system, one or more power supplies, and other assemblies associated with generating, managing, and distributing power for the client 300.

The multimedia assembly 308 includes a screen that provides an output interface between the client 300 and the user. In some embodiments, the multimedia assembly 308 includes a front camera and/or a rear camera. When the client 300 is in an operation mode, such as a photographing mode or a video mode, the front camera and/or the rear camera may receive external multimedia data. Each front camera and rear camera may be a fixed optical lens system or have a focal length and an optical zooming capability.

The audio assembly 310 is configured to output and/or input audio signals. For example, the audio assembly 310 includes a microphone (MIC) configured to receive external audio signals when the client 300 is in an operation mode, such as a call mode, a record mode, and a voice recognition mode. The received audio signals may be further stored in the memory 304 or transmitted via the communication assembly 316. In some embodiments, the audio assembly 310 further includes a loudspeaker for outputting an audio signal.

The I/O interface provides an interface between the processing assembly 302 and a peripheral interface module. The peripheral interface module may be keyboards, trigger wheels, buttons, and the like. These buttons may include, but are not limited to, a home button, volume button, start button, and lock button.

The sensor assembly 314 includes one or more sensors for providing status assessments of various aspects to the client 300. For example, the sensor assembly 314 can detect an on/off state of the device 300, and a relative positioning of assemblies, for example, the assembly is a display and keypad of the client 300. The sensor assembly 314 can further detect a change in position of the client 300 or an assembly of the client 300, the presence or absence of user contact with the client 300, orientation or acceleration/deceleration of the client 300, and a change in temperature of the client 300. The sensor assembly 314 may include a proximity sensor, configured to detect the existence of nearby objects without any physical contact. The sensor assembly 314 may further include an optical sensor, such as a CMOS or CCD image sensor, that is used in imaging application. In some embodiments, the sensor assembly 314 may further include an acceleration sensor, a gyroscope sensor, a magnetic sensor, a pressure sensor, or a temperature sensor.

The communication assembly 316 is configured to facilitate wired or wireless communication between the client 300 and other devices. The client 300 may access a wireless network based on a communication standard, such as WiFi, 2G or 3G, or a combination thereof. In one exemplary embodiment, the communication assembly 316 receives a broadcast signal or broadcast-related information from an external broadcast management system via a broadcast channel. In one exemplary embodiment, the communication assembly 316 further includes a near field communication (NFC) module to facilitate short range communication. For example, the NFC module may be implemented based on radio frequency identification (RFID) technology, infrared data association (IrDA) technology, ultra-wide band (UWB) technology, bluetooth (BT) technology, and other technologies.

In an exemplary embodiment, the client 300 may be implemented with one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronic elements for performing the following methods:

determining an operation region and determining a trigger region, the operation region being a region operated in a screen for using an input method, and the trigger region being a region covered by an external entity when the external entity touches the screen;

determining a display region of the virtual keyboard according to the operation region;

determining an area of each virtual key in the virtual keyboard according to the trigger region; and     setting the virtual keyboard according to the display region of the virtual keyboard and the area of each virtual key.

In some embodiments, the determining an operation region includes:

acquiring farthest end coordinates, the farthest end coordinates being used for characterizing a farthest position in the screen where the external entity can touch when using the electronic device; and     determining the operation region according to the farthest end coordinates.

In some embodiments, the determining the operation region according to the farthest end coordinates includes:

determining a first arc according to at least three of the farthest end coordinates, the first arc being used for characterizing a farthest position where the external entity can touch;

determining a first sector region according to the first arc and a target screen frame, the target screen frame being a screen frame near a center of the first arc; and     determining the operation region based on the first sector region.

In some embodiments, before the determining the operation region based on the first sector region, the method further includes:

acquiring at least three sets of nearest end coordinates, and determining a second arc according to the at least three sets of nearest end coordinates, the nearest end coordinates being used for characterizing a nearest position in the screen where the external entity can touch when using the electronic device;

determining a second sector region according to the second arc and the target screen frame;

determining an intermediate region according to the first sector region and the second sector region, the intermediate region being a remaining region after removing the second sector region from the first sector region; and     the determining the operation region based on the first sector region including:

determining the first sector region as the operation region, or     determining the intermediate region as the operation region.

In some embodiments, the determining a trigger region includes:

determining the trigger region when using the electronic device, the trigger region being a region covered by the external entity during performing a trigger operation in the screen when using the electronic device.

In some embodiments, the determining the trigger region when using the electronic device includes:

determining, during acquiring farthest end coordinates, a coverage region when each of the farthest end coordinates is triggered, and determining the coverage region as the trigger region.

In some embodiments, before the determining an operation region and determining a trigger region, the method further includes:

determining a type of the virtual keyboard according to a parameter of the electronic device, the type of the virtual keyboard including an integrated keyboard and a split keyboard;

the determining an operation region and determining a trigger region including:

determining a trigger region and two of operation regions in response to the type of the virtual keyboard being determined as the split keyboard; and     the setting the virtual keyboard according to the display region of the virtual keyboard and the area of each virtual key including:

setting the virtual keyboard according to the display region of the virtual keyboard corresponding to the two of the operation regions and the area of each virtual key.

Figure 4:
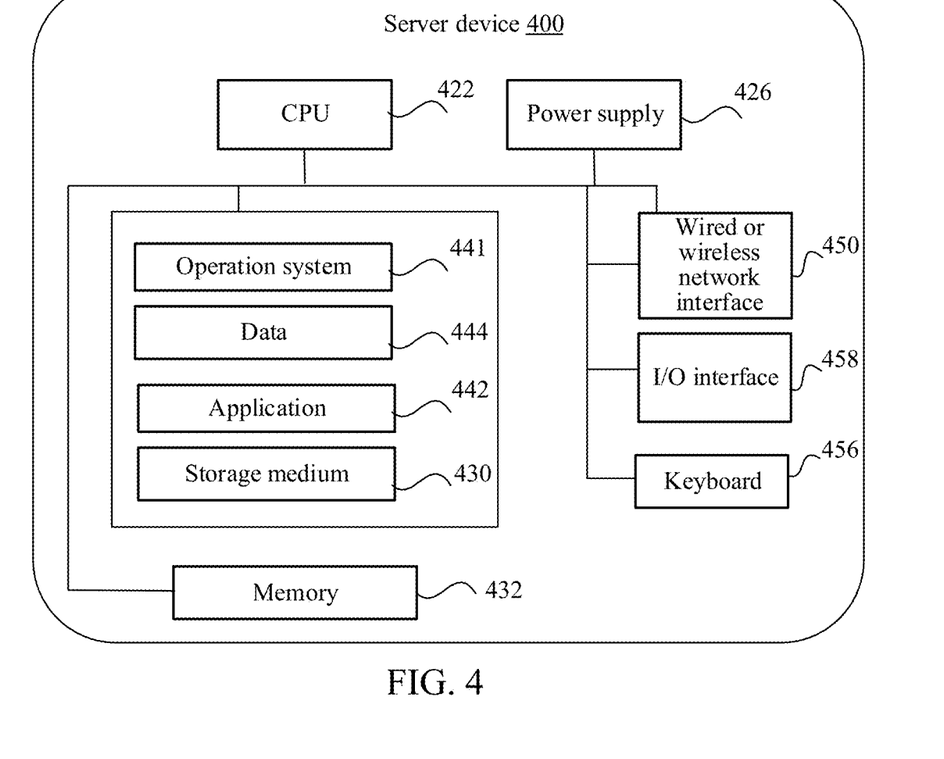
FIG. 4 is a structural diagram of a server provided by an embodiment of the present disclosure.

FIG. 4 is a structural diagram of a server according to an embodiment of the present disclosure. The server 400 may vary widely in configuration or performance and may include one or more central processing units (CPU) 422 (for example, one or more processors) and a memory 432, one or more storage media 430 (for example, one or more mass storage devices) storing applications 442 or data 444. The memory 432 and storage media 430 may be transient storage or persistent storage. Programs stored on the storage media 430 may include one or more modules (not shown in the drawing), each of which may include a series of instruction operations of a server. Further, the CPU 422 may be configured to communicate with the storage media 430 and execute a series of instruction operations of the storage media 430 on the server 400.

Further, the CPU 422 may perform the following methods:

determining an operation region and determining a trigger region, the operation region being a region operated in a screen for using an input method, and the trigger region being a region covered by an external entity when the external entity touches the screen;

determining a display region of the virtual keyboard according to the operation region;

determining an area of each virtual key in the virtual keyboard according to the trigger region; and     setting the virtual keyboard according to the display region of the virtual keyboard and the area of each virtual key.

In some embodiments, the determining an operation region includes:

acquiring farthest end coordinates, the farthest end coordinates being used for characterizing a farthest position in the screen where the external entity can touch when using the electronic device; and determining the operation region according to the farthest end coordinates.

In some embodiments, the determining the operation region according to the farthest end coordinates includes:

determining a first arc according to at least three of the farthest end coordinates, the first arc being used for characterizing a farthest position where the external entity can touch;

determining a first sector region according to the first arc and a target screen frame, the target screen frame being a screen frame near a center of the first arc; and determining the operation region based on the first sector region.

In some embodiments, before the determining the operation region based on the first sector region, the method further includes:

acquiring at least three nearest end coordinates, and determining a second arc according to the at least three nearest end coordinates, the nearest end coordinates being used for characterizing a nearest position in the screen where the external entity can touch when using the electronic device;

determining a second sector region according to the second arc and the target screen frame;

determining an intermediate region according to the first sector region and the second sector region, the intermediate region being a remaining region after removing the second sector region from the first sector region; and the determining the operation region based on the first sector region including:

determining the first sector region as the operation region, or determining the intermediate region as the operation region.

In some embodiments, the determining a trigger region includes:

determining the trigger region when using the electronic device, the trigger region being a region covered by the external entity during performing a trigger operation in the screen when using the electronic device.

In some embodiments, the determining the trigger region when using the electronic device includes:

determining, during acquiring farthest end coordinates, a coverage region when each of the farthest end coordinates is triggered, and determining the coverage region as the trigger region.

In some embodiments, before the determining an operation region and determining a trigger region, the method further includes:

determining a type of the virtual keyboard according to a parameter of the electronic device, the type of the virtual keyboard including an integrated keyboard and a split keyboard;

the determining an operation region and determining a trigger region including:

determining a trigger region and two of operation regions in response to the type of the virtual keyboard being determined as the split keyboard; and the setting the virtual keyboard according to the display region of the virtual keyboard and the area of each virtual key including:

setting the virtual keyboard according to the display region of the virtual keyboard corresponding to the two of the operation regions and the area of each virtual key.

The server 400 may further include one or more power supplies 426, one or more wired or wireless network interfaces 450, one or more I/O interfaces 458, one or more keyboards 456, and/or one or more operation systems 441 such as Windows Server™, Mac OS X™, Unix™, Linux™, FreeBSD™, and the like.

The embodiments of the present disclosure further provide a computer-readable medium storing thereon instructions, which cause an apparatus to perform the virtual keyboard setting method provided by the above method embodiments when executed by one or more processors.

The embodiments of the present disclosure provide a computer program product including computer program codes, the computer program codes being stored in a computer-readable storage medium, a processor of a computer device reading the computer program codes from the computer-readable storage medium, and the processor executing the computer program codes to cause the computer device execute the virtual keyboard setting method provided by the embodiments of the present disclosure.

Other embodiments of the present disclosure will readily come to the mind of those skilled in the art upon consideration of the specification and practice of the invention disclosed herein. The present disclosure is intended to cover any variation, use, or adaptive change of the present disclosure. These variations, uses, or adaptive changes follow the general principles of the present disclosure and include common general knowledge or common technical means, which are not disclosed in the present disclosure, in the art. It is intended that the specification and embodiments be considered as exemplary only, with a true scope and spirit of the present disclosure being indicated by the following claims.

It is to be understood that the present disclosure is not limited to the precise structures described above and shown in the drawings, and various modifications and changes can be made without departing from the scope of the present disclosure. The scope of the present disclosure is limited only by the appended claims.

The above are only exemplary embodiments of the present disclosure and are not intended to limit the present disclosure. Any modification, equivalent substitution, improvement, and the like made within the spirit and principles of the present disclosure shall be covered by the present disclosure.

What is claimed is:

1. A virtual keyboard setting method applied to an electronic device, the method comprising:

acquiring farthest end coordinates, a set of the farthest end coordinates indicating a farthest position in a screen touched by a single finger of one hand when using the electronic device with the one hand;

determining a first arc according to at least three sets of the farthest end coordinates, the first arc characterizing farthest positions where the single finger can touch;

determining a first sector region according to the first arc and target screen frames, the target screen frames being side-frames of the screen located closest to a center of the first arc;

determining an operation region based on the first sector region, the operation region being a region operated in the screen for using an input method;

determining a trigger region, the trigger region being a region covered by the single finger when a belly of the single finger contacts the screen in a single touch;

determining a display region of a virtual keyboard according to the operation region;

determining an area of individual virtual keys in the virtual keyboard according to the trigger region, a size of the area of each individual virtual key being no less than a size of the trigger region; and setting the virtual keyboard according to the display region of the virtual keyboard and the area of the virtual key, wherein the display region of the virtual keyboard includes a first set of virtual keys located in the first sector region and a second set of virtual keys located outside of the first sector region, a usage frequency of the first set of virtual keys being higher than a usage frequency of the second set of virtual keys.

2. The method according to claim 1, wherein: the method further comprises:

acquiring at least three sets of nearest end coordinates triggered by user operations, and determining a second arc according to the at least three sets of nearest end coordinates, a set of the nearest end coordinates characterizing a nearest position in the screen touched by the single finger when using the electronic device;

determining a second sector region according to the second arc and the target screen frame; and determining an intermediate region according to the first sector region and the second sector region, the intermediate region being a remaining region after removing the second sector region from the first sector region; and the determining the operation region based on the first sector region comprises:

determining the first sector region as the operation region, or determining the intermediate region as the operation region.

3. The method according to claim 1, wherein the determining a trigger region comprises:

determining the trigger region when using the electronic device, the trigger region being a region covered by the single finger during performing a trigger operation in the screen when using the electronic device.

4. The method according to claim 3, wherein the determining the trigger region when using the electronic device comprises:

determining, when acquiring the farthest end coordinates, a coverage region corresponding to the farthest end coordinates, and determining the coverage region as the trigger region.

5. The method according to claim 1, wherein the method further comprises:

determining a type of the virtual keyboard according to a parameter of the electronic device, types of the virtual keyboard comprising an integrated keyboard and a split keyboard;

the determining an operation region and a trigger region comprises:

determining the trigger region and determining two of the operation regions in response to the type of the virtual keyboard being determined as the split keyboard; and the setting the virtual keyboard according to the display region of the virtual keyboard and the area of each virtual key comprises:

setting the virtual keyboard according to the display region of the virtual keyboard corresponding to the two of the operation regions and the area of the virtual key.

6. A virtual keyboard setting apparatus, comprising:

at least one memory and at least one processor, one or more programs being stored in the at least one memory, the at least one processor being configured to execute the one or more programs and perform:

acquiring farthest end coordinates, a set of the farthest end coordinates indicating a farthest position in a screen touched by a single finger of one hand when using the electronic device with the one hand;

determining a first arc according to at least three sets of the farthest end coordinates, the first arc characterizing farthest positions where the single finger can touch;

determining a first sector region according to the first arc and target screen frames, the target screen frames being side-frames of the screen located closest to a center of the first arc;

determining an operation region based on the first sector region, the operation region being a region operated in the screen for using an input method;

determining a trigger region, the trigger region being a region covered by the single finger when a belly of the single finger contacts the screen in a single touch;

determining a display region of a virtual keyboard according to the operation region;

determining an area of individual virtual keys in the virtual keyboard according to the trigger region, a size of the area of each individual virtual key being no less than a size of the trigger region; and setting the virtual keyboard according to the display region of the virtual keyboard and the area of the virtual key, wherein the display region of the virtual keyboard includes a first set of virtual keys located in the first sector region and a second set of virtual keys located outside of the first sector region, a usage frequency of the first set of virtual keys being higher than a usage frequency of the second set of virtual keys.

7. The apparatus according to claim 6, wherein:

the at least one processor is further configured to perform:

acquiring at least three sets of nearest end coordinates triggered by user operations, and determining a second arc according to the at least three sets of nearest end coordinates, a set of the nearest end coordinates being used for characterizing a nearest position in the screen touched by the single finger where the external entity can touch when using the electronic device;

determining a second sector region according to the second arc and the target screen frame; and determining an intermediate region according to the first sector region and the second sector region, the intermediate region being a remaining region after removing the second sector region from the first sector region; and the determining the operation region based on the first sector region comprises:

determining the first sector region as the operation region, or determining the intermediate region as the operation region.

8. The apparatus according to claim 6, wherein the determining a trigger region comprises:

determining the trigger region when using the electronic device, the trigger region being a region covered by the single finger during performing a trigger operation in the screen when using the electronic device.

9. The apparatus according to claim 8, wherein the determining the trigger region when using the electronic device comprises:
   determining, when acquiring the farthest end coordinates, a coverage region corresponding to the farthest end coordinates, and determining the coverage region as the trigger region.

10. The apparatus according to claim 6, wherein:
   the at least one processor is further configured to perform:
      determining a type of the virtual keyboard according to a parameter of the electronic device, types of the virtual keyboard comprising an integrated keyboard and a split keyboard;
   the determining an operation region and a trigger region comprises:
      determining the trigger region and determining two of the operation regions in response to the type of the virtual keyboard being determined as the split keyboard; and
   the setting the virtual keyboard according to the display region of the virtual keyboard and the area of each virtual key comprises:
      setting the virtual keyboard according to the display region of the virtual keyboard corresponding to the two of the operation regions and the area of the virtual key.

11. A non-transitory storage medium comprising a stored program, the program, when executed by at least one processor, causing the at least one processor to perform:
   acquiring farthest end coordinates, a set of the farthest end coordinates indicating a farthest position in a screen touched by a single finger of one hand when using the electronic device with the one hand;
   determining a first arc according to at least three sets of the farthest end coordinates, the first arc characterizing farthest positions where the single finger can touch;
   determining a first sector region according to the first arc and target screen frames, the target screen frames being side-frames of the screen located closest to a center of the first arc;
   determining an operation region based on the first sector region, the operation region being a region operated in the screen for using an input method;
   determining a trigger region, the trigger region being a region covered by the single finger when a belly of the single finger contacts the screen in a single touch;
   determining a display region of a virtual keyboard according to the operation region;
   determining an area of individual virtual keys in the virtual keyboard according to the trigger region, a size of the area of each individual virtual key being no less than a size of the trigger region; and
   setting the virtual keyboard according to the display region of the virtual keyboard and the area of the virtual key,
   wherein the display region of the virtual keyboard includes a first set of virtual keys located in the first sector region and a second set of virtual keys located outside of the first sector region, a usage frequency of the first set of virtual keys being higher than a usage frequency of the second set of virtual keys.

12. The storage medium according to claim 11, wherein:
   the program further causes at least one processor to perform:
      acquiring at least three sets of nearest end coordinates triggered by user operations, and determining a second arc according to the at least three sets of nearest end coordinates, a set of the nearest end coordinates characterizing a nearest position in the screen touched by the single finger when using the electronic device;
      determining a second sector region according to the second arc and the target screen frame; and
      determining an intermediate region according to the first sector region and the second sector region, the intermediate region being a remaining region after removing the second sector region from the first sector region; and
   the determining the operation region based on the first sector region comprises:
      determining the first sector region as the operation region, or determining the intermediate region as the operation region.

13. The storage medium according to claim 11, wherein the determining a trigger region comprises:
   determining the trigger region when using the electronic device, the trigger region being a region covered by the single finger during performing a trigger operation in the screen when using the electronic device.

14. The storage medium according to claim 13, wherein the determining the trigger region when using the electronic device comprises:
   determining, when acquiring the farthest end coordinates, a coverage region corresponding to the farthest end coordinates, and determining the coverage region as the trigger region.

* * * * *